United States Patent
Hishikawa

(10) Patent No.: US 12,522,021 B2
(45) Date of Patent: Jan. 13, 2026

(54) RUBBER COMPOSITION FOR TIRE TREAD AND PNEUMATIC TIRE USING THE SAME

(71) Applicant: Toyo Tire Corporation, Itami (JP)

(72) Inventor: Yasuhiro Hishikawa, Itami (JP)

(73) Assignee: Toyo Tire Corporation, Itami (JP)

( * ) Notice: Subject to any disclaimer, the term of this patent is extended or adjusted under 35 U.S.C. 154(b) by 502 days.

(21) Appl. No.: 18/128,419

(22) Filed: Mar. 30, 2023

(65) Prior Publication Data

US 2023/0331043 A1    Oct. 19, 2023

(30) Foreign Application Priority Data

Apr. 15, 2022   (JP) ................................. 2022-067794

(51) Int. Cl.
| | |
|---|---|
| *C08L 9/06* | (2006.01) |
| *B60C 1/00* | (2006.01) |
| *C08K 3/36* | (2006.01) |
| *C08K 5/548* | (2006.01) |
| *C08L 25/08* | (2006.01) |

(52) U.S. Cl.
CPC .............. *B60C 1/0016* (2013.01); *C08K 3/36* (2013.01); *C08K 5/548* (2013.01); *C08L 9/06* (2013.01); *C08L 25/08* (2013.01); *C08L 2205/025* (2013.01); *C08L 2205/035* (2013.01)

(58) Field of Classification Search
CPC .. C08L 9/06; C08L 91/00; C08L 57/02; C08L 91/08; C08K 3/04; C08K 3/36; C08K 5/548; C08K 3/22; C08K 5/09; C08K 3/06; C08K 5/31; C08K 5/47
See application file for complete search history.

(56) References Cited

U.S. PATENT DOCUMENTS

| | | | |
|---|---|---|---|
| 8,741,994 B1 * | 6/2014 | Hishikawa ............ | B60C 1/0016 534/593 |
| 8,765,844 B2 * | 7/2014 | Masumoto ............... | C08K 3/34 523/150 |
| 11,034,821 B2 * | 6/2021 | Maeda .................... | C08C 19/25 |
| 11,214,667 B2 * | 1/2022 | Steiner .................... | C08L 91/00 |
| 11,220,591 B2 * | 1/2022 | De Gaudemaris ....... | C08K 5/09 |
| 11,241,912 B2 * | 2/2022 | Watanabe ............. | B60C 1/0016 |
| 11,254,755 B2 * | 2/2022 | Mun ..................... | C08F 236/10 |
| 11,254,804 B2 * | 2/2022 | Gornard .................... | B60C 1/00 |
| 11,279,817 B2 * | 3/2022 | Riddle ...................... | C08L 9/00 |
| 11,292,895 B2 * | 4/2022 | Recker ..................... | C08L 9/00 |
| 11,370,900 B2 * | 6/2022 | Tani ......................... | C08K 3/36 |
| 11,390,117 B2 * | 7/2022 | Watanabe ................. | C08L 9/06 |
| 11,441,021 B2 * | 9/2022 | Steiner ............... | C08F 293/005 |
| 12,017,480 B2 * | 6/2024 | Pibre ........................ | C08K 3/36 |
| 12,187,894 B2 * | 1/2025 | Kitago ................. | C08F 236/10 |
| 12,227,651 B2 * | 2/2025 | Recker ................... | C08C 19/25 |
| 12,304,245 B2 * | 5/2025 | Ono ....................... | C08F 236/06 |
| 2003/0114577 A1 * | 6/2003 | Yatsuyanagi ............ | C08J 3/226 524/495 |
| 2015/0038643 A1 * | 2/2015 | Hishikawa .............. | C09C 1/043 556/427 |
| 2019/0264012 A1 * | 8/2019 | Hishikawa ................ | B60C 1/00 |
| 2019/0264013 A1 * | 8/2019 | Hishikawa .............. | C08L 21/00 |
| 2021/0179818 A1 * | 6/2021 | Nagai ................... | F16F 1/3605 |

FOREIGN PATENT DOCUMENTS

| | | |
|---|---|---|
| JP | 3636546 B2 | 4/2005 |
| JP | 2007-321046 A | 12/2007 |
| JP | 5902583 B2 | 4/2016 |

* cited by examiner

*Primary Examiner* — Peter A Salamon
(74) *Attorney, Agent, or Firm* — WHDA, LLP

(57) ABSTRACT

A rubber composition for a tire tread is disclosed, which provides a tire excellent in wet grip performance at low temperatures and wet grip performance at high temperatures. The rubber composition for a tire tread includes, per 100 parts by mass of diene-based rubbers including (a) 30 to 50 parts by mass of a styrene butadiene rubber having a glass transition point of −35° C. or more, (b) 20 to 40 parts by mass of a styrene butadiene rubber having a glass transition point of −45° C. or more and less than −35° C., and (c) 10 to 30 parts by mass of a styrene butadiene rubber having a glass transition point of −65° C. or more and less than −45° C.: 80 to 140 parts by mass of silica; and 15 to 50 parts by mass of a thermoplastic resin having a softening point of 40° C. or more.

10 Claims, No Drawings

RUBBER COMPOSITION FOR TIRE TREAD AND PNEUMATIC TIRE USING THE SAME

BACKGROUND OF THE INVENTION

1. Field of the Invention

The present invention relates to a rubber composition for a tire tread and also to a pneumatic tire using the same.

2. Description of Related Art

In rubber compositions used for tires, there is a demand to improve the grip performance on wet road surfaces (wet grip performance).

In order to address such a problem, JP2007-321046A describes that a styrene butadiene rubber having a glass transition point of −30 to 0° C. is used as a rubber component. In addition, JP3636546B and JP5902583B describe that a high-softening-point resin is used to improve grip performance. However, there still has been room for improvement in wet grip performance at low temperatures.

SUMMARY OF THE INVENTION

In light of the above points, an object of an aspect of the invention is to provide a rubber composition that provides a pneumatic tire excellent in wet grip performance at low temperatures (5° C.) and wet grip performance at high temperatures (25° C.)

The invention encompasses the following embodiments.

[1] A rubber composition for a tire tread, including, per 100 parts by mass of diene-based rubbers including (a) 30 to 50 parts by mass of a styrene butadiene rubber having a glass transition point of −35° C. or more, (b) 20 to 40 parts by mass of a styrene butadiene rubber having a glass transition point of −45° C. or more and less than −35° C., and (c) 10 to 30 parts by mass of a styrene butadiene rubber having a glass transition point of −65° C. or more and less than −45° C.: 80 to 140 parts by mass of silica; and 15 to 50 parts by mass of a thermoplastic resin having a softening point of 40° C. or more.

[2] The rubber composition for a tire tread according to [1], wherein the styrene butadiene rubber (a) and the styrene butadiene rubber (b) each have a styrene content of 30 mass % or more.

[3] The rubber composition for a tire tread according to [1] or [2], wherein the thermoplastic resin is a styrene-based resin or a terpene-based resin.

[4] The rubber composition for a tire tread according to any one of [1] to [3], having a storage modulus at −5° C. of 150 MPa or less.

[5] The rubber composition for a tire tread according to any one of [1] to [4], including 5 to 20 parts by mass of a protected mercaptosilane per 100 parts by mass of silica.

[6] A pneumatic tire using the rubber composition according to any one of [1] to [5] in a tread thereof.

According to a rubber composition for a tire tread of an aspect of the invention, a pneumatic tire excellent in wet grip performance at low temperatures (5° C.) and wet grip performance at high temperatures (25° C.) can be obtained.

DESCRIPTION OF EMBODIMENTS

Hereinafter, matters relevant to the practice of the invention will be described in detail.

A rubber composition for a tire tread according to this embodiment includes, per 100 parts by mass of diene-based rubbers including (a) 30 to 50 parts by mass of a styrene butadiene rubber (SBR) having a glass transition point (Tg) of −35° C. or more, (b) 20 to 40 parts by mass of a styrene butadiene rubber (SBR) having a glass transition point (Tg) of −45° C. or more and less than −35° C., and (c) 10 to 30 parts by mass of a styrene butadiene rubber (SBR) having a glass transition point (Tg) of −65° C. or more and less than −45° C.: 80 to 140 parts by mass of silica; and 15 to 50 parts by mass of a thermoplastic resin having a softening point of 40° C. or more. As used herein, the glass transition point is a value measured in accordance with JIS K7121 by a differential scanning calorimetry (DSC) method at a temperature rise rate of 20° C./min (measurement temperature range: −150° C. to 150° C.). The softening point is a value measured by the ring and ball method in accordance with JIS K2207.

The diene-based rubbers may include components other than the above components (a) to (c), but preferably consist of the above components (a) to (c). As diene-based rubbers other than the above components (a) to (c), for example, natural rubbers (NR), synthetic isoprene rubbers (IR), butadiene rubbers (BR), nitrile rubbers (NBR), chloroprene rubbers (CR), butyl rubbers (IIR), styrene-isoprene copolymer rubbers, butadiene-isoprene copolymer rubbers, styrene-isoprene-butadiene copolymer rubbers, and the like can be mentioned.

Specific examples of the diene-based rubbers listed above also include modified diene rubbers having at least one functional group selected from the group consisting of a hydroxyl group, an amino group, a carboxyl group, an alkoxy group, an alkoxysilyl group, and an epoxy group introduced at the molecular terminal or molecular chain thereof and thus modified with the functional group.

The styrene content of the component (a) and that of the component (b) are each preferably 30 mass % or more, and more preferably 30 to 45 mass %. When the styrene content is within the above range, excellent wet grip performance is likely to be obtained.

The rubber composition according to this embodiment contains silica as a reinforcing filler. Silica is not particularly limited, and, for example, wet silica such as wet-precipitated silica or wet-gelled silica may be used.

The silica content is, per 100 parts by mass of the diene-based rubbers, 80 to 140 parts by mass, preferably 100 to 140 parts by mass, and more preferably 110 to 130 parts by mass.

As the reinforcing filler, in addition to silica, carbon black may also be used in combination. The reinforcing filler content (the total amount of silica and carbon black) is not particularly limited and may be, per 100 parts by mass of the diene-based rubbers, 80 to 170 parts by mass, 100 to 160 parts by mass, or 110 to 150 parts by mass. The carbon black content is not particularly limited either and may be, per 100 parts by mass of the diene-based rubbers, 1 to 30 parts by mass, or 5 to 20 parts by mass.

The rubber composition according to this embodiment preferably contains a silane coupling agent. In that case, the silane coupling agent content is, per 100 parts by mass of silica, preferably 5 to 20 parts by mass, and more preferably 5 to 15 parts by mass. In addition, the silane coupling agent content is, per 100 parts by mass of the diene-based rubbers, preferably 4 to 30 parts by mass, and more preferably 5 to 20 parts by mass.

As silane coupling agents, sulfide silanes such as bis(3-triethoxysilylpropyl)tetrasulfide (e.g., "Si69" manufactured by Degussa AG), bis(3-triethoxysilylpropyl) disulfide (e.g., "Si75" manufactured by Degussa AG), bis(2-triethoxysilylethyl)tetrasulfide, bis(4-triethoxysilylbutyl)disulfide, bis(3-trimethoxysilylpropyl) tetrasulfide, and bis(2-trimethoxysilylethyl) disulfide, mercaptosilanes such as γ-mercaptopropyltrimethoxysilane, γ-mercaptopropyltriethoxysilane, mercaptopropylmethyldimethoxysilane, mercaptopropyldimethylmethoxysilane, and mercaptoethyltriethoxysilane, and protected mercaptosilanes such as 3-octanoylthio-1-propyltriethoxysilane and 3-propionylthiopropyltrimethoxysilane can be mentioned. Among them, protected mercaptosilanes are preferable.

The rubber composition according to this embodiment contains a thermoplastic resin having a softening point of 40° C. or more, and the softening point is preferably 40 to 160° C. As a result of containing a thermoplastic resin having a softening point of 40° C. or more, excellent wet grip performance is likely to be obtained.

The thermoplastic content is, per 100 parts by mass of the diene-based rubbers, 15 to 50 parts by mass, preferably 20 to 40 parts by mass. When the thermoplastic resin content is within the above range, excellent wet grip performance is likely to be obtained.

As thermoplastic resins, styrene-based resins, terpene-based resins, petroleum-based hydrocarbon resins, rosin-based resins, and the like can be mentioned, and, among them, styrene-based resins and terpene-based resins are preferable.

Styrene-based resins may be resins containing styrene and/or α-methylstyrene as a constituent monomer, examples thereof including homopolymers obtained by polymerizing styrene or α-methylstyrene alone, copolymers obtained by copolymerizing styrene and α-methylstyrene, and copolymers of styrene and/or α-methylstyrene with other monomers. As other monomers, for example, terpene compounds such as α-pinene, β-pinene, dipentene, limonene, myrcene, alloocimene, ocimene, α-phellandrene, α-terpinolene, γ-terpinene, terpinolene, 1,8-cineole, 1,4-cineol, α-terpineol, β-terpineol, and γ-terpineol (terpene-based monomers), non-conjugated olefins such as ethylene, propylene, 1-butene, 1-pentene, 1-hexene, 1-heptene, and 1-octene, and the like can be mentioned. They may be used alone, and it is also possible to use two or more kinds in combination.

As terpene-based resins, for example, terpene-based resins such as an α-pinene polymer, a β-pinene polymer, and a dipentene polymer, modified terpene-based resins obtained by modifying these terpene-based resins (phenol modification, aromatic modification, hydrocarbon modification, etc.) (e.g., terpene phenol-based resins, styrene-modified terpene-based resins, aromatic-modified terpene-based resins, etc.), and the like can be mentioned.

As petroleum-based hydrocarbon resins, for example, C5-based aliphatic hydrocarbon resins, C9-based aromatic hydrocarbon resins, and C5/C9-based aliphatic/aromatic copolymer hydrocarbon resins can be mentioned. An aliphatic hydrocarbon resin is a resin obtained by the cationic polymerization of an unsaturated monomer such as isoprene or cyclopentadiene, which is a petroleum fraction equivalent to four to five carbon atoms (C5 fraction), and may also be partially hydrogenated. An aromatic hydrocarbon resin is a resin obtained by the cationic polymerization of a monomer such as vinyltoluene, an alkylstyrene, or indene, which is a petroleum fraction equivalent to eight to ten carbon atoms (C9 fraction), and may also be partially hydrogenated. An aliphatic/aromatic copolymer hydrocarbon resin is a resin obtained by copolymerizing the above C5 and C9 fractions by cationic polymerization, and may also be partially hydrogenated.

As rosin-based resins, for example, raw material rosins such as gum rosin, wood rosin, and tall oil rosin, disproportionated products of raw material rosins, polymerized rosins, and like rosins, esterified products of rosins (rosin ester resins), phenol-modified rosins, unsaturated acid- (e.g., maleic acid-) modified rosins, formylated rosins obtained by reduction-treating rosins, and the like can be mentioned.

The rubber composition according to this embodiment may contain an oil. As the oil, any of various oils generally blended into rubber compositions can be used. For example, a mineral oil, that is, at least one mineral oil selected from the group consisting of a paraffinic oil, a naphthenic oil, and an aromatic oil, may be used. The oil content is, per 100 parts by mass of the diene-based rubbers, preferably 5 to 50 parts by mass, and more preferably 10 to 45 parts by mass.

In addition to the above components, the rubber composition according to this embodiment may have blended therein various additives generally used in rubber compositions, such as zinc oxide, stearic acid, antioxidants, waxes, vulcanizing agents, and vulcanization accelerators.

A preferred example of the vulcanizing agents is sulfur. The vulcanizing agent content is not particularly limited, but is, per 100 parts by mass of the rubber component, preferably 0.1 to 10 parts by mass, and more preferably 0.5 to 5 parts by mass. In addition, as the vulcanization accelerators, for example, sulfenamide-based, thiuram-based, thiazole-based, guanidine-based, and like various vulcanization accelerators can be mentioned. They can be used alone, and it is also possible to use a combination of two or more kinds. The vulcanization accelerator content is not particularly limited, but is, per 100 parts by mass of the rubber component, preferably 0.1 to 7 parts by mass, and more preferably 0.5 to 5 parts by mass.

For the reason that excellent wet grip performance can be obtained, the rubber composition according to this embodiment preferably has a storage modulus at −5° C. of 150 MPa or less. Here, "storage modulus at −5° C." is the value of the storage modulus measured at −5° C., a frequency of 10 Hz, a dynamic strain of 0.2%, and a static strain of 10%.

The rubber composition according to this embodiment can be made by kneading in the usual manner using a commonly used mixer, such as a Banbury mixer, a kneader, or a roll. That is, for example, in the first mixing stage, additives excluding a vulcanizing agent and a vulcanization accelerator are added to diene-based rubbers and mixed, and then, in the final mixing stage, a vulcanizing agent and a vulcanization accelerator are added to the obtained mixture and mixed. As a result, a rubber composition can be prepared.

The rubber composition thus obtained is applicable to the treads of pneumatic tires of various sizes for various applications, including tires for passenger cars, large-sized tires for trucks and buses, and the like. That is, in the usual manner, the rubber composition is formed into a predetermined shape by extrusion, for example, and combined with other parts to make a green tire. Subsequently, the green tire is vulcanization-molded at 140 to 180° C., for example, whereby a pneumatic tire can be produced.

EXAMPLES

Hereinafter, examples of the invention will be shown, but the invention is not limited to these examples.

Using a lab mixer, following the formulations (parts by mass) shown in Table 1 below, first, in the first mixing stage, ingredients excluding sulfur and a vulcanization accelerator were added to a diene-based rubber component and kneaded (discharge temperature: 160° C.). Next, in the final mixing stage, sulfur and a vulcanization accelerator were added to the obtained kneaded product and kneaded (discharge temperature: 90° C.), thereby preparing a rubber composition. The details of the components in Table 1 are as follows.

SBR 1: "HP 755" manufactured by JSR Corporation, Tg=−27° C., styrene content=39.5 mass %
SBR 2: "SBR 0122" manufactured by JSR Corporation, Tg=−40° C., styrene content=37 mass %
SBR 3: "SBR 1502" manufactured by JSR Corporation, Tg=−52° C., styrene content=23.5 mass %
SBR 4: "HP R840" manufactured by JSR Corporation, Tg=−60° C., styrene content=10 mass %
SBR 5: "TUF 1834" manufactured by Asahi Kasei Corporation, Tg=−70° C., styrene content=18 mass %
Carbon black: "SEAST KH" manufactured by Tokai Carbon Co., Ltd.
Silica: "Nipsil AQ" manufactured by Tosoh Silica Corporation
Silane coupling agent 1: "Si75" manufactured by Evonik, sulfide silane
Silane coupling agent 2: "NXT" manufactured by Momentive Performance Materials, protected mercaptosilane
Oil: "PROCESS NC140" manufactured by ENEOS Corporation
Thermoplastic resin 1: Styrene-based resin, "SYLVATRAXX 4401" manufactured by Kraton, softening point=85° C.
Thermoplastic resin 2: C5/C9-based resin, "Petrotack 90" manufactured by Tosoh Corporation, softening point=100° C.
Thermoplastic resin 3: Terpene-based resin, "SYLVATRAXX 4150" manufactured by Kraton, softening point=115° C.
Zinc oxide: "Type 2 Zinc Oxide" manufactured by Mitsui Mining & Smelting Co., Ltd.
Stearic acid: "LUNAC S-20" manufactured by Kao Corporation
Wax: "OZOACE 0355" manufactured by Nippon Seiro Co., Ltd.
Antioxidant 1: "NOCRAC 6C" manufactured by Ouchi Shinko Chemical Industrial Co., Ltd.
Antioxidant 2: "ANTAGE RD" manufactured by Kawaguchi Chemical Industry Co., Ltd.
Vulcanization accelerator 1: "NOCCELER D" manufactured by Ouchi Shinko Chemical Industrial Co., Ltd.
Vulcanization accelerator 2: "SOXINOL CZ" manufactured by Sumitomo Chemical Co., Ltd.
Sulfur: "Powder Sulfur" manufactured by Tsurumi Chemical Industry Co., Ltd.

Each obtained rubber composition was vulcanized at 160° C. for 20 minutes to make a test piece having a predetermined shape, and a dynamic viscoelasticity test was performed at −5° C. In addition, using each obtained rubber composition, a pneumatic tire was made and evaluated for wet grip performance. The measurement methods are as follows.

Storage Modulus at −5° C. (E' (−5° C.)): Using a viscoelasticity tester manufactured by GABO, the storage modulus was measured at −5° C., a frequency of 10 Hz, a dynamic strain of 0.2%, and a static strain of 10%.

Wet Grip Performance (5° C.): Four 215/45ZR17 test radial tires having the rubber composition obtained above in the tread were mounted on a vehicle. Under 5° C. temperature conditions, the vehicle was run on a road surface with a water depth of 1 mm at a speed of 100 km/h, and then the ABS was activated. The braking distance at this time was measured, and the reciprocal of the measured value was calculated. The result was evaluated as an index, taking the result in Comparative Example 1 as 100. A larger index indicates better wet braking performance.

Wet Grip Performance (25° C.): Four 215/45ZR17 test radial tires having the rubber composition obtained above in the tread were mounted on a vehicle. Under 25° C. temperature conditions, the vehicle was run on a road surface with a water depth of 1 mm at a speed of 100 km/h, and then the ABS was activated. The braking distance at this time was measured, and the reciprocal of the measured value was calculated. The result was evaluated as an index, taking the result in Comparative Example 1 as 100. A larger index indicates better wet braking performance.

TABLE 1

|  | Comparative Example 1 | Comparative Example 2 | Comparative Example 3 | Comparative Example 4 | Comparative Example 5 | Example 1 | Example 2 | Example 3 | Example 4 | Example 5 | Example 6 | Example 7 | Example 8 |
|---|---|---|---|---|---|---|---|---|---|---|---|---|---|
| SBR 1 | 50 | 35 | 35 | 65 | 40 | 40 | 40 | 40 | 35 | 45 | 50 | 40 | 40 |
| SBR 2 | 50 | 30 | 20 | 20 | 35 | 35 | 35 | 35 | 40 | 25 | 20 | 35 | 35 |
| SBR 3 | — | — | 45 | 15 | 25 | 25 | — | 25 | 25 | 15 | 15 | 25 | 25 |
| SBR 4 | — | — | — | — | — | — | 25 | — | — | — | — | — | — |
| SBR 5 | — | 35 | — | — | — | — | — | — | — | 15 | 15 | — | — |
| Carbon black | 10 | 10 | 10 | 10 | 10 | 10 | 10 | 10 | 10 | 10 | 10 | 10 | 10 |
| Silica | 120 | 120 | 120 | 120 | 145 | 120 | 120 | 120 | 120 | 120 | 120 | 120 | 120 |
| Silane coupling agent 1 | — | — | — | — | — | — | — | — | — | — | — | — | 10 |
| Silane coupling agent 2 | 10 | 10 | 10 | 10 | 10 | 10 | 10 | 10 | 10 | — | — | 10 | — |
| Oil | 37.5 | 37.5 | 37.5 | 37.5 | 37.5 | 37.5 | 37.5 | 37.5 | 37.5 | 37.5 | 37.5 | 37.5 | 37.5 |
| Thermoplastic resin 1 | 22 | 22 | 22 | 22 | 22 | 2.2 | 22 | — | — | 22 | — | — | 22 |
| Thermoplastic resin 2 | — | — | — | — | — | — | — | 22 | 22 | — | 22 | — | — |

TABLE 1-continued

| | Comparative Example 1 | Comparative Example 2 | Comparative Example 3 | Comparative Example 4 | Comparative Example 5 | Example 1 | Example 2 | Example 3 | Example 4 | Example 5 | Example 6 | Example 7 | Example 8 |
|---|---|---|---|---|---|---|---|---|---|---|---|---|---|
| Thermoplastic resin 3 | — | — | — | — | — | — | — | — | — | — | — | 22 | — |
| Zinc oxide | 3 | 3 | 3 | 3 | 3 | 3 | 3 | 3 | 3 | 3 | 3 | 3 | 3 |
| Stearic acid | 2 | 2 | 2 | 2 | 2 | 2 | 2 | 2 | 2 | 2 | 2 | 2 | 2 |
| Wax | 2 | 2 | 2 | 2 | 2 | 2 | 2 | 2 | 2 | 2 | 2 | 2 | 2 |
| Antioxidant 1 | 2 | 2 | 2 | 2 | 2 | 2 | 2 | 2 | 2 | 2 | 2 | 2 | 2 |
| Antioxidant 2 | 2 | 2 | 2 | 2 | 2 | 2 | 2 | 2 | 2 | 2 | 2 | 2 | 2 |
| Vulcanization accelerator 1 | 2 | 2 | 2 | 2 | 2 | 2 | 2 | 2 | 2 | 2 | 2 | 2 | 2 |
| Vulcanization accelerator 2 | 2 | 2 | 2 | 2 | 2 | 2 | 2 | 2 | 2 | 2 | 2 | 2 | 2 |
| Sulfur | 2 | 2 | 2 | 2 | 2 | 2 | 2 | 2 | 2 | 2 | 2 | 2 | 2 |
| E' (−5° C.) | 220 | 100 | 140 | 280 | 160 | 90 | 110 | 120 | 110 | 135 | 145 | 110 | 145 |
| Wet grip performance (5° C.) | 100 | 97 | 105 | 90 | 95 | 109 | 110 | 102 | 102 | 101 | 101 | 102 | 101 |
| Wet grip performance (25° C.) | 100 | 95 | 95 | 105 | 95 | 105 | 106 | 102 | 101 | 102 | 103 | 103 | 102 |

The results are as shown in Table 1. Examples 1 to 8 were superior to Comparative Example 1 in wet grip performance at low temperatures and wet grip performance at high temperatures.

Comparative Examples 2 and 3 are examples where the component (c) content exceeds the upper limit. Comparative Example 2 was inferior to Comparative Example 1 in wet grip performance at low temperatures and wet grip performance at high temperatures, and Comparative Example 3 was inferior to Comparative Example 1 in wet grip performance at high temperatures.

Comparative Example 4 is an example where the component (a) content exceeds the upper limit, and was inferior to Comparative Example 1 in wet grip performance at low temperatures.

Comparative Example 5 is an example where the silica content exceeds the upper limit, and was inferior to Comparative Example 1 in wet grip performance at low temperatures and wet grip performance at high temperatures.

The rubber composition of the invention can be used as a rubber composition for various tires for passenger cars, light trucks, buses, and the like.

What is claimed is:

1. A rubber composition for a tire tread, comprising, per 100 parts by mass of diene-based rubbers including
   (a) 30 to 50 parts by mass of a styrene butadiene rubber having a glass transition point of −35° C. or more,
   (b) 20 to 40 parts by mass of a styrene butadiene rubber having a glass transition point of −45° C. or more and less than −35° C., and
   (c) 10 to 30 parts by mass of a styrene butadiene rubber having a glass transition point of −65° C. or more and less than −45° C.:
   80 to 140 parts by mass of silica; and
   15 to 50 parts by mass of a thermoplastic resin having a softening point of 40° C. or more.

2. The rubber composition for a tire tread according to claim 1, wherein the styrene butadiene rubber (a) and the styrene butadiene rubber (b) each have a styrene content of 30 mass % or more.

3. The rubber composition for a tire tread according to claim 1, wherein the thermoplastic resin is a styrene-based resin or a terpene-based resin.

4. The rubber composition for a tire tread according to claim 2, wherein the thermoplastic resin is a styrene-based resin or a terpene-based resin.

5. The rubber composition for a tire tread according to claim 1, having a storage modulus at −5° C. of 150 MPa or less.

6. The rubber composition for a tire tread according to claim 2, having a storage modulus at −5° C. of 150 MPa or less.

7. The rubber composition for a tire tread according to claim 1, comprising 5 to 20 parts by mass of a protected mercaptosilane per 100 parts by mass of silica.

8. The rubber composition for a tire tread according to claim 2, comprising 5 to 20 parts by mass of a protected mercaptosilane per 100 parts by mass of silica.

9. A pneumatic tire using the rubber composition according to claim 1 in a tread thereof.

10. A pneumatic tire using the rubber composition according to claim 2 in a tread thereof.

* * * * *